Patented May 20, 1941

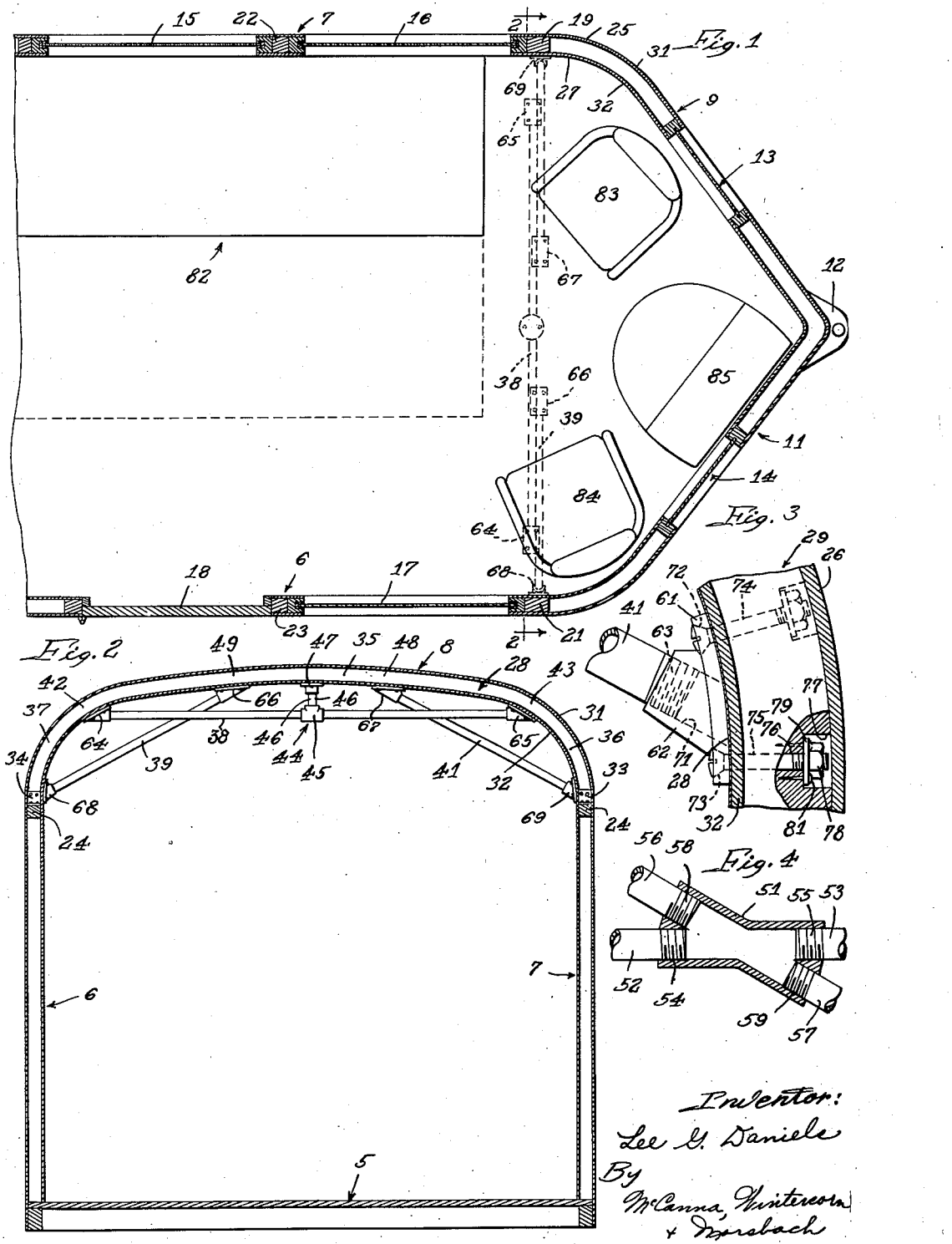
May 20, 1941. L. G. DANIELS 2,242,391
TRAILER
Filed Nov. 5, 1938

2,242,391

UNITED STATES PATENT OFFICE 2,242,391

TRAILER

Lee G. Daniels, Rockford, Ill.

Application November 5, 1938, Serial No. 238,995

3 Claims. (Cl. 296—137)

This invention relates to trailers of the type commonly known as house trailers and usually drawn behind a conventional automobile of pleasure type, and refers more specifically to trailers of the so-called American type.

The most serious problem in the construction of trailers of the type mentioned is that of space for accommodating the required articles and functions, and it is for this reason as well as for appearance sake that some American manufacturers have formed the front end of the trailer to a point somewhat after the shape of a wedge standing edgewise, by which device a certain amount of usable space is obtained within the body as distinguished from the English type in which the front wall is substantially at right angles to the side walls, that is, the front is in the main, flat as distinguished from pointed. This increase in space is obtained without increasing the overall length of the trailer and tow car due to the fact that a certain distance must be provided between the front end of the side walls and the back of the tow car to accommodate the fenders and a portion of the rear of the tow car during turning.

Thus, while a certain amount of additional space is included within the body of an American type trailer, this space has frequently been a detriment rather than a benefit for the reason that it has only been capable of utilization as storage space instead of clear floor space, and it is the latter which is at such a premium in house trailers. This results from the fact that a trailer when in motion is subject to excessive strains, from rough roads, wind, snow, and ice, and with a wedge-shaped front end this has made it necessary to build cabinets across the front end to provide sufficient rigidity, thus to a considerable extent losing the advantages of the extra space as livable space for the occupant to move about in.

I have found that this movement or warpage or twisting of the trailer walls is due to certain inherent weakness in trailer construction, particularly the separate formation of the top, and I have also found that the walls do not require bracing throughout their height, but that if a certain type of bracing is employed, located exclusively adjacent the top, the difficulty may be overcome without sacrificing the floor space in the wedge-shaped portions of the front end, whereby this space may be utilized for living room for the occupant to move about in and the objectionable storage compartment may be eliminated from this point.

An important object of the invention is to provide an American type trailer having unobstructed floor space in the wedge-shaped front end thereof in which the occupant may walk about.

Another object of the invention is the provision of a trailer body construction having greater living room space within the same overall length than has been possible in prior constructions.

A still further object of the invention is the provision of an American type trailer wherein the cabinets or shelving heretofore positioned across the wedge-shaped front end is eliminated and this space is rendered suitable for living room space.

A still further object of the invention is the provision of an American type trailer having improved bracing construction in the front end thereof, and improved means for attaching the bracing to the interior of the trailer body.

Other objects and advantages will appear from the following description and the accompanying drawing, in which—

Figure 1 is a horizontal section through the front end of a trailer embodying my invention;

Fig. 2 is a section substantially on the line 2—2 of Figure 1;

Fig. 3 is an enlarged fragmentary view showing the manner of attaching the braces, and Fig. 4 is a section through a modified form of the invention showing an alternative form of brace structure.

In the drawing I have shown the invention as embodied in a conventional house type trailer, but it will be understood that the invention is not strictly limited to this type but may be applied to any American type trailer regardless of the purpose to which the interior thereof may be placed. In the drawing, the numeral 5 designates the floor of the trailer, the numerals 6 and 7 designate the side walls thereof, the numeral 8 indicates the top, while the numerals 9 and 11 designate the side walls of the wedge-shaped front end or nose of the trailer. A bracket or hitch 12 is attached to the front end of the trailer and serves for attachment thereof to a tow car (not shown). The wedge-shaped front end of the trailer has in this instance windows 13 and 14, the side wall 7 has windows 15 and 16, and the side wall 6 has a window 17 and a door 18. It will be understood that other windows are also distributed along the side walls of the trailer as may be desired by the manufacturer. Conventionally, however, the door 18 should be adjacent the front end of the trailer so as to provide the living room space in the front end.

The walls of the trailer are made in accordance with conventional practice having upstanding studs 19, 21, 22, 23, etc., properly spaced around the body, the upper ends thereof being connected by a top frame member 24 for the purpose of lending rigidity thereto. The side walls are commonly covered with a covering of ply wood or the like 25 which in many instances is in turn covered by an outer protective and decorative cover of fabric 26, such as canvas, rubber covered fabric, imitation leather or the like, and the inner surface of the side walls may likewise be covered with a layer 27 of ply wood or the like, which in turn may or may not have an outer protective and decorative cover 28 of similar nature, such as imitation leather.

The top of the body consists of a boat-like structure inverted and seated on the top of the side walls, and consisting of bows 29 spaced longitudinally of the body having outer coverings of ply wood or the like 31 and 32 having inner and outer protective and decorative coatings identical with the side wall and similar to the coatings 26 and 28. To secure the top to the side wall the bows are attached to the header plate 24 by means of angle iron brackets 33 and 34, or by equivalent structure, the object being to attach the top to the side walls without excessively increasing the weight of the body. The top conventionally has full length bows arranged rearwardly from the studs 19 and 21, whereas from these studs forward into the wedge-shaped front the bows are differently arranged and commonly consist of only part of a complete bow structure or progressively smaller bows.

It will be seen from Fig. 2 that each of the bows 29 has a central portion 35 which approaches straightness and has downwardly curved side portions 36 and 37 which make contact with the header 24. In the past, it has been necessary in constructing trailers of this type to build a cabinet extending from wall to wall and tying together the studs 19 and 21, the cabinet commonly extending from the floor to the ceiling and thus providing lateral bracing for the walls 6 and 7 and bracing for the top. This was necessary because of the tendency of the side walls to weave in and out under the forces applied to them when the trailer was in motion, such, for example, as the wind pressure against the front corners and the top, and sometimes by the weight of snow and the like on the top of the body. The wind against the corners tends to force the bows in and collapse the side walls, and the force against the top tends to force the bows and side walls out, thus producing an in and out force which loosens screws and nails and thus destroys the trailer body. I have discovered that this cabinet or bracing means having cabinets therein can be eliminated and that the space within the wedge-shaped nose of the trailer can be employed for living room space by bracing the front end of the trailer adjacent the top, and that the bracing provided by the cabinets against the lower portions of the walls can be eliminated if a certain type of bracing is employed at an elevated point, sufficiently high so as not to interfere with the full and free use of the space by the occupants as a part of the living room for the reception of tables, chairs and the like.

To this end I employ a horizontally disposed strut or brace of just sufficient height so that the average person can walk thereunder without stooping designated generally by the numeral 38 and two diagonally disposed struts or braces 39 and 41. The brace 38 is attached at its ends to the bow 29 at points equally spaced from the ends of the bow and just at the beginning of the downwardly curved side portions 36 and 37, such points being indicated at 42 and 43. Advantageously though not necessarily the mid point of the brace 38 may be connected to the mid point of the bow 29 by means of a fitting such as shown at 44, in this instance consisting of a T 45, a tube 46 and a plate 47, the T being interposed in the brace 38 and the plate 47 being attached to the bow. Advantageously the brace 38 may consist of a tube which may be suitably surfaced, as, for example, by chromium plating. The diagonal braces 39 and 41 extend from the sides of the bow 29 to points adjacent the center of the bow, as, for example, the points 48 and 49, the diagonal braces crossing the horizontal brace 38, as best shown in Fig. 2. Ordinarily the width of the bow 29 will be such as to permit the braces to cross in the manner shown in Fig. 2. This bow may, however, be somewhat narrower if fittings such as shown in Fig. 4 are employed, in which case a fitting 51 is interposed in the brace 38 so that this brace will consist of a central portion 52 and end portions such as shown at 53 connected to the bow 29 at the points 42 and 43, the ends of the portions 52 being threaded into openings in the fitting as shown at 54 and 55. Likewise the diagonal braces 39 and 41 will consist of end portions 56 attached to the bow at the points 48 and 49 and end portions 57 attached to the sides of the bow, these portions likewise being threaded into the fitting as shown at 58 and 59. Through this means the horizontal brace 38 and the diagonal braces 39 and 41 may rest in the same vertical plane.

I have also provided improved means for securing the braces against the inside walls of the trailer body for the purpose of attaching the braces to the bow. These are best shown in Fig. 3 and consist of a plate 61 adapted to seat against the inside wall and over the decorative covering thereon. This plate has an outwardly extending boss 62 for the reception of a threaded end 63 of the braces. It will be observed that the angularity of the boss 62 will vary somewhat depending upon the brace with which it is intended to be used. In other words, brackets 64 and 65 are positioned on the ends of the brace 38, and the boss 62 on these brackets will have the same angularity. Likewise, brackets 66 and 67 serve to attach the upper end of the diagonal braces 39 and 41, and the bosses of these brackets will be identical. Again brackets 68 and 69 serve to secure the lower ends of the diagonal braces 39 and 41 to the inside of the bow, and the bosses of these two brackets will be identical. The boss 62 has a socket 71 for the reception of the threaded end 63 of the brace. The plate 61 has pairs of openings 72 and 73 for the reception of bolts 74 and 75 which pass through the plate 61, the covering 28, the ply wood liner 32, and the bow 29, the bow having holes 76 for the passage of the bolts. The bows also have counter-bores 77 for the reception of nuts 78 of the type having a flange 79 through which pass a plurality of nails or screws 81, the screws serving to hold the nut in position in the counter-bore 77 upon the removal of the screw. The bolts are of such length that they do not project beyond the counter-bore 77 when completely inserted.

It will be seen from this bracket construction that the brackets may be removed without in any way disturbing the outside covering of the body by simply turning the bolts 74 and 75. Upon the removal of the bolts the brackets may be removed from their position against the inner decorative surface for the purpose of replacing this surface, making repairs to the inner ply wood coating of the body, or the like. The brackets may also be replaced from the inside of the body since the nuts 79 are held in position for reception of the bolts upon re-insertion. It will be seen that through this means the brackets and braces may be held in position by means of bolts rather than conventional wood screws, making a much more permanent connection, since the wood screws tend to gradually work loose under force to which the trailer walls are subjected.

Attention is directed to the advantages resulting from my improved construction. In Figure 1 I have shown the manner in which the living room space of the trailer is increased as a result thereof. In this view the numeral 82 designates the usual folding bed commonly placed in the position indicated. This bed is of the type which for sleeping purposes folds out to the position shown in dotted lines, and it will be seen that this may be accomplished without in any way disturbing the chairs 83 and 84 or the table 85. It will further be seen that this would be entirely impossible were the trailer body to be filled with cabinets from the studs 19 and 21 forward, under which circumstance one chair and the table would have to be eliminated from the living room furniture. It will thus be seen that through my invention I have provided sufficient additional space to accommodate a table and chair without in any wise increasing the outside dimensions of the trailer. In addition to this, I have provided a much more rigid front end in the trailer, and I have also eliminated the storage cabinets which have frequently been the cause of trouble due to overloading of these cabinets and thus throwing an excessive proportion of the weight on the rear of the tow car. Where storage cabinets are necessary such cabinets can be placed in the trailer at points nearer the wheels thereof or directly over the wheels so that excessive loading in the cabinets will not place too great a load on the rear springs of the automobile. It will be seen that the strut and brace and members are assembled in the trailer so as to depend from the ceiling thereof, and the upper portion of the wide walls, utilizing in this small area a part of the head room to produce the required rigidity, and that these are assembled after the interior side walls and the ceiling covers are finished. These are removable for repairing or refinishing the ceiling or walls, they provide sufficient head room under the center part of the bracing to give a living room which extends from the very point in the wedge-shaped front end through the full length of the trailer so that the occupant can walk from one end to the other.

While I have thus described and illustrated a specific embodiment of the invention, I do not wish to be limited except as required by the prior art and the scope of the appended claims, in which I claim:

1. The combination in a house trailer of a permanently assembled body having a wedge-shaped front end, a living room space adjacent thereto and an arched bowed roof having a plurality of full length cross bows and a plurality of shorter roof bows over said front end, an interior covering for said body, a strutted bracing means attached to the interior of the first full length bow, plates adapted to seat against the inner surface of the body and over said covering, and attachment means for removing and replacing said bracing means to rigidly connect the ends of said first bow to prevent weaving and for ready removal and resurfacing of said covering, said bracing means being located at sufficient height to extend the living room of the trailer into the wedge-shaped front end to permit the occupant to walk the full length of the living room.

2. The combination in a house trailer of a body having a wedge-shaped front end, a floor, side walls and a top, the body being free of obstructions in said wedge-shaped front end from the floor substantially to said top to provide space in which the occupant may walk, said top having a plurality of full length bows spaced longitudinally thereof, each of said bows having downwardly curved side portions, a covering positioned on the inner surface of said body, and means within the interior of the body space depending from the top and upper side walls into the head space of the body to prevent weaving of the top and side walls adjacent said front end comprising a horizontally disposed brace member connecting points intermediate the ends of the foremost of said bows, diagonally disposed brace members crossing said horizontally disposed brace member and connecting the sides of said bow with intermediate points thereon, and means for connecting the ends of said brace members with the bow, comprising a plate shaped to seat against said bow with the covering therebetween, means for rigid attachment of the brace thereto, and readily removable means passing through said plate and into said bow to rigidly connect the side portions and intermediate portions of said bow to render said plates and said brace members readily removable for replacement of said covering.

3. The combination in a house trailer of a body having a wedge-shaped front end, a floor, side walls and a top, the body being free of permanent obstructions in said wedge-shaped front end to provide space in which the occupant may walk, said top having a plurality of full length bows spaced longitudinally thereof, each of said bows having downwardly curved side portions, a covering positioned on the inner surface of said body, and means within the interior of the body space depending from the top and upper side walls into the head space of the body to prevent weaving of the top and side walls adjacent said front end comprising a horizontally disposed tube forming a brace member connecting points intermediate the ends of said bow, diagonally disposed tube brace members crossing said horizontally disposed brace members and connecting the sides of said bow with intermediate points thereon, and means for connecting the ends of said tubes with said bow comprising a plate shaped to seat against said bow with the covering therebetween, said plate having a threaded socket for the reception of the threaded end of said tube, a plurality of bolts passing through said plate and said bow, and nuts countersunk in the outer surface of said bow to rest below the surface thereof, said nuts being secured to said bow by means other than the bolts to render said plates and said brace members readily removable for replacement of said covering.

LEE G. DANIELS.